United States Patent [19]

Valyi

[11] Patent Number: 5,756,018
[45] Date of Patent: May 26, 1998

[54] FOOTED PLASTIC BOTTLE

[75] Inventor: Emery I. Valyi, Katonah, N.Y.

[73] Assignee: PepsiCo, Inc., Purchase, N.Y.

[21] Appl. No.: 720,144

[22] Filed: Sep. 25, 1996

Related U.S. Application Data

[62] Division of Ser. No. 408,728, Mar. 22, 1995, abandoned.

[51] Int. Cl.[6] .................................................. B29C 49/08
[52] U.S. Cl. .......................... 264/40.1; 264/532; 215/375; 428/36.92; 428/542.8
[58] Field of Search ........................ 264/40.1, 523, 264/532, 537; 425/525, 532, 534; 198/376, 379, 394; 428/36.92, 542.8; 215/375

[56] References Cited

U.S. PATENT DOCUMENTS

| 4,950,514 | 8/1990 | Strassheimer | 428/36.92 |
| 5,104,706 | 4/1992 | Krishnakumar et al. | 428/36.92 |
| 5,116,565 | 5/1992 | Yoshino | 264/532 |
| 5,160,059 | 11/1992 | Collette et al. | 264/523 |
| 5,282,526 | 2/1994 | Gibbemeyer | 198/376 |
| 5,498,152 | 3/1996 | Unterlander et al. | 425/534 |
| 5,614,148 | 3/1997 | Beck et al. | 264/532 |

*Primary Examiner*—Catherine Timm
*Attorney, Agent, or Firm*—Bachman & LaPointe, P.C.

[57] ABSTRACT

A process for forming a footed plastic container, comprising the steps of providing a preform having a neck portion with an open top end, an elongated cylindrical body portion with inner and outer walls and a lower end, wherein the lower end includes a plurality of thickened portions; providing a blow mold in the shape of a footed container having an elongated sidewall, wherein the blow mold includes a plurality of separate container foot forming cavities; inserting the preform into the blow mold; placing each of the thickened portions in a predetermined position relative to the foot forming cavities; and stretch blow molding the preform, and displacing material from each of the thickened portions into one of the foot forming cavities to form the plastic container.

9 Claims, 3 Drawing Sheets

FOOTED PLASTIC BOTTLE

This is a Division of application Ser. No. 08/408,728 filed Mar. 22, 1995, now abandoned.

BACKGROUND OF THE INVENTION

This invention is directed to plastic containers, and more particularly, to plastic containers and a process for forming the containers having molded feet, wherein the thickness of the wall of the container forming the molded feet is preferably thicker than the cylindrical sidewalls of the container.

Footed plastic containers have been developed for giving containers additional stability so that they may stand erect. The footed containers are generally characterized by a base having several downwardly extending protrusions, in the form of feet, upon which the bottom may rest on a surface in the upright position. While this construction provides stability, it is not favorable for several reasons.

During the manufacture of the footed containers, preforms must be stretched and blown in a blow molding operation. The material forming the wall of the container becomes thinner as it is expanded from its original position as the preform wall. As the wall thins during expansion via blowing, it also cools and as it cools, it becomes increasingly difficult to deform, thereby requiring high pressure for continuing the deforming of the preforms. Moreover, by the time feet are formed by blowing, which is typically after the main cylindrical body of the bottle has been blown into contact with the mold, the deforming wall may have a temperature much lower than best suited for orientation. Accordingly, the feet of the container may become overstretched, resulting in increased brittleness and the likelihood of stress cracking of the bottle in the footed area while in service. These shortfalls hold true for most containers having footed bottoms. However, the degree to which problems are experienced, depends on the specific geometry of the feet.

The origin of the aforementioned problems is in the specific design of the preforms which are used to form the footed containers. Typically, the preforms used are in the shape of a test tube having an annular cross section in the regions that are to form the body and base of the bottle, wherein the thickness of the annular cross-section is dependent on the axial location of the section. The portion of the preform that is adapted to be blown into the feet is also annular. As a result, the thickness of the container walls will tend to be greater than the thickness at the deepest region of the feet. This occurs because the thickness at the annular cross-sections of the preform for all sections to be molded are substantially the same yet the amount of expansion required in the area to be blown into the feet is greater. The following patents are directed to preforms and containers, some of which have feet and all of which suffer from the shortfalls described above.

U.S. Pat. No. 3,598,270 discloses one of the first footed containers and is entitled "Bottom End Structure for Plastic Containers". The patent discloses a blow molded plastic container having a tubular body terminating at a generally hemispherical outwardly convexed bottom wall with a lowermost polar portion. The bottom wall is interrupted by a plurality of downwardly projecting wall portions defining hollow legs with adjacent legs being spaced from each other by meridian wall portions of the bottom wall. At least two of the meridian wall portions are disposed in generally diametrically opposed relationship and the two meridian walls have a common parison weld along an arc of a radius equal to that of the hemispherical bottom wall. The hollow legs terminate in feet having radially inwardly directed apex wall portions. The apex wall portions and at least two meridian wall portions merge at the polar portion. The preform used for forming the container described is essentially as described above, wherein the thickness of the walls of the preform are substantially uniform regardless of the portion of the container to which the walls are to be blown. As discussed above, this causes the resulting footed container to have substantially overstretched feet.

U.S. Pat. No. 4,978,015 to Walker discloses another footed container for pressurized fluids. It has a generally cylindrical sidewall portion and a bottom structure which comprises a central portion, a plurality of ribs extending downwardly from the sidewall portion to the central portion, and a plurality of feet extending below the central portion from the sidewall portion. The ribs are defined by an upper curvilinear surface and, in cross-section, are substantially U-shaped having a relatively tight radius. The upper surfaces of the ribs lie on a generally hemispherical curvature in the interior of the container. Each foot is positioned between two ribs and has a pair of ribs defining end walls connected to and continuous with the ribs on each side of the curvilinear outer wall. The curvilinear outer wall is connected to and continuous with the sidewall portion. A generally horizontal base surface is joined to the outer wall and a generally vertical first inner surface forms a lip extending upwardly from the base surface. A second inner surface extends from the lip of the central portion. As can be seen from the figures, the feet portions of the Walker container have substantially the same thickness as the cylindrical sidewall portions. Accordingly, the Walker container suffers from the same shortfalls discussed above.

U.S. Pat. No. 4,885,197 to Strassheimer discloses a plastic preform for forming blow molded non-footed plastic bottles. The plastic preform includes a tubular body portion having an inside wall face and a bottom structure, the tubular body portion adjacent the bottom structure and extending into the bottom structure has a plurality of flat faces with terminal portions thereof. Scalloped-shaped segments are provided for connecting the terminal portions of each flat face so as to initiate deformation of the preform at the scalloped-shaped segments, prior to deformation of the flat faces. As shown in FIGS. 4 and 6 of this patent, the preform is used for forming a container having a continuous peripheral seating ring with alternating thicker and thinner portions upon which the bottle rests which surrounds a generally concave central portion. In order to secure stability in such a design, the thickness of the base is made greater than in footed bottles if stability is to be obtained and wobbling avoided.

There exists, therefore, a need for a footed container and a process for forming the same wherein a uniform wall thickness of the base is obtained by forming the feet from preform walls having greater thickness than the preform walls used to form the rest of the base, i.e., by varying the corresponding cross sectional thickness of the preform.

SUMMARY OF THE INVENTION

The primary object of this invention is to provide a footed container and a process for making the same which eliminates the shortfalls of the prior art footed containers.

Another object of this invention is to provide a footed container having thickened walls in the foot forming areas for greater stability and wherein the walls have improved material properties.

Still another object of this invention is to provide a process for forming a footed container having thickened walls in the footed area from a preform having thickened segments in a base area which are adapted to be blown into the container feet.

Yet another object of this invention is to provide a process for forming footed containers using preforms having improved geometries compared to currently available processes.

The foregoing objects are attained through the process of the present invention for forming a footed plastic container, which comprises the steps of providing a preform having a neck portion with an open top end, an elongated cylindrical body portion with inner and outer walls and a lower end. The inner wall at the lower end of the preform includes a plurality of thickened portions and the process further includes providing a blow mold having a cavity in the shape of a footed container having an elongated sidewall, wherein said blow mold includes a plurality of individual container foot forming cavities; inserting the preform into the blow mold; positioning the foot forming cavities with respect to the preform so as to enable the thickened portions to provide the desired wall thickness of the feet; and stretch blowing the elongated body portion into the elongated side wall, blow molding the preform and displacing material from each of the thickened portions into one of the foot cavities.

The details of the present invention are set out in the following description and drawings wherein like reference characters depict like elements.

DETAILED DESCRIPTION OF THE PREFERRED EMBODIMENT

Figure 1:
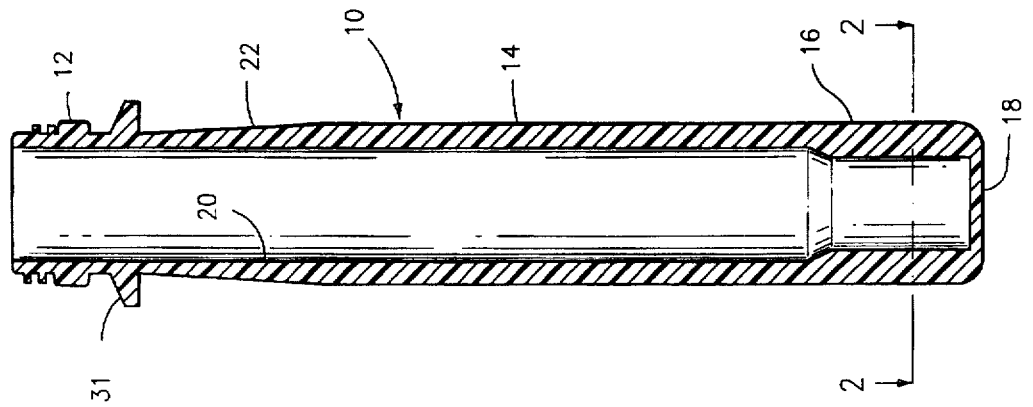
FIG. 1 is an elevational and cross-sectional view of a preform used to form a footed container via a process of the present invention.

Referring now to the drawings in detail, there is shown in FIG. 1, an elevational and cross-sectional view of a preform 10 used for forming the footed container of the present invention. Preform 10 includes an upper neck portion 12 having an open top end, an intermediate elongated cylindrical body portion 14, and a lower cylindrical end 16 having a closed end 18.

Preform 10, a more detailed description of which is incorporated herein with reference to U.S. Pat. No. 4,885, 197 to Strassheimer issued Dec. 5, 1989, has an inner wall 20 and an outer wall 22. The design of the inner wall 20, as shown in FIG. 2, at lower end 16 is important to forming the footed container of the present invention shown in FIGS. 5 and 6, and discussed below.

Figure 2:
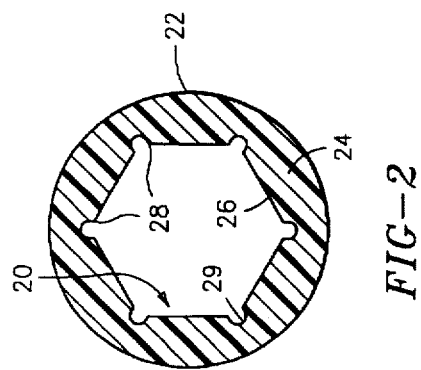
FIG. 2 is a cross-sectional view taken along line 2—2 of FIG. 1 showing a plurality of thickened areas which are adapted to correspond to foot-forming cavities of a mold and form container feet.

FIG. 2 shows a cross-sectional view of preform 10 taken along line 2—2 of FIG. 1. As shown in FIG. 2, the inner wall 20 of preform 10 at the lower end 16 is preferably comprised of a plurality of thickened portions 24 defined between flat faces 26, having terminal ends 28, and outer wall 22. Each terminal end 28 of each flat face 26 is preferably separated from the terminal ends of the other flat faces via a scalloped-shaped segment 29. Scalloped-shaped segments 29 are provided to permit initiating deformation in the preform in sequence between segments 29 and flat faces 26 during blow molding of preform 10 into a container 30 (shown in FIGS. 5 and 6).

Figure 4:
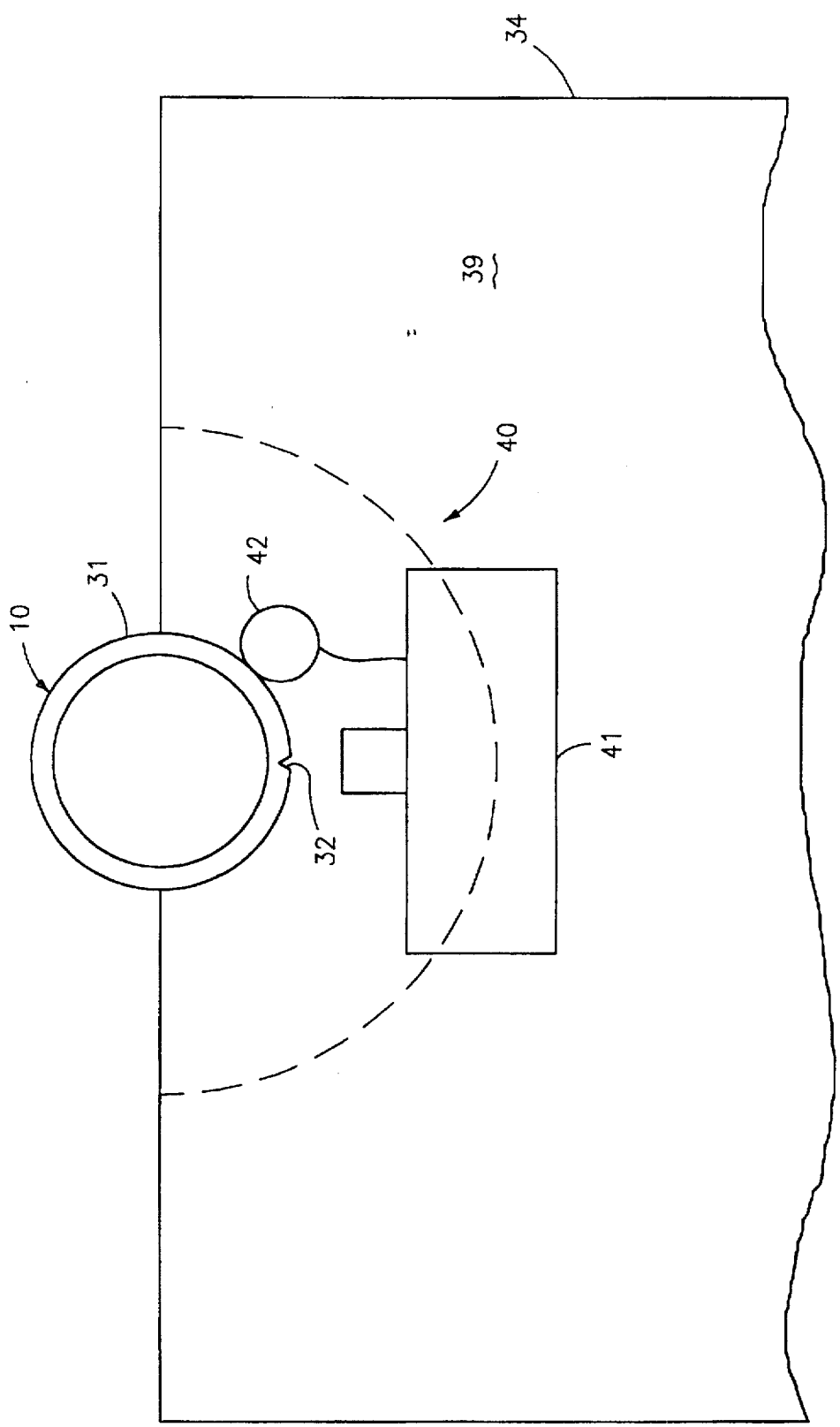
FIG. 4 is an overhead view of FIG. 3 showing a preform positioning mechanism.

Also, preform 10 preferably has a support ring 31 with a notch 32 or other mechanical, optical or electrical sensing index, as shown in FIG. 4, in the peripheral edge thereof as a position indicator for engagement with or for sensing by a positioning mechanism the purpose and nature of which are discussed below.

Figure 3:
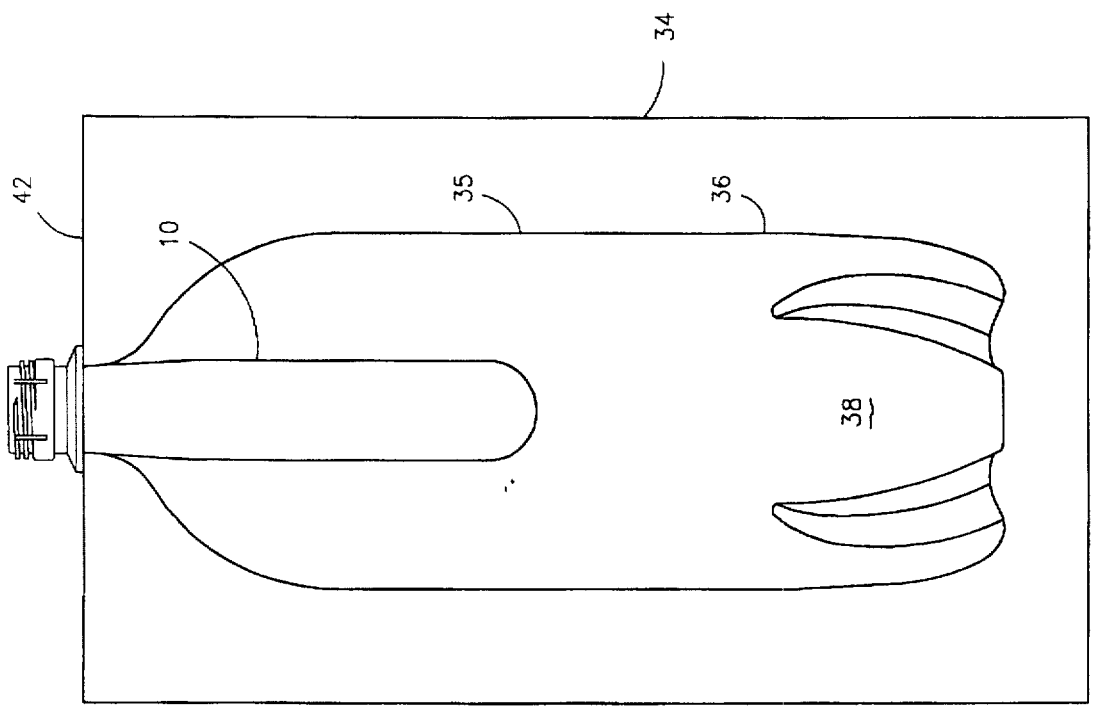
FIG. 3 is an elevational view of a blow mold with the preform of FIG. 1 positioned therein such that the thickened areas for forming the thickened feet of the footed container determine the wall thickness produced in the foot-forming cavities of a mold.
Figure 5:
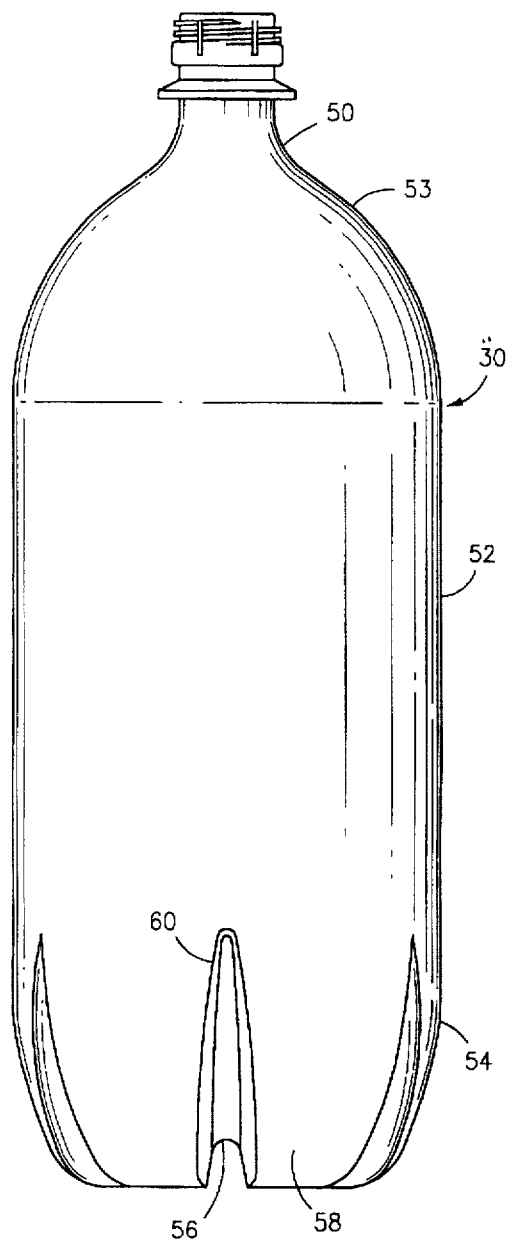
FIG. 5 is an elevational view of a footed container formed from the preform of FIG. 1, mold of FIG. 3 and the process of the present invention.
Figure 6:
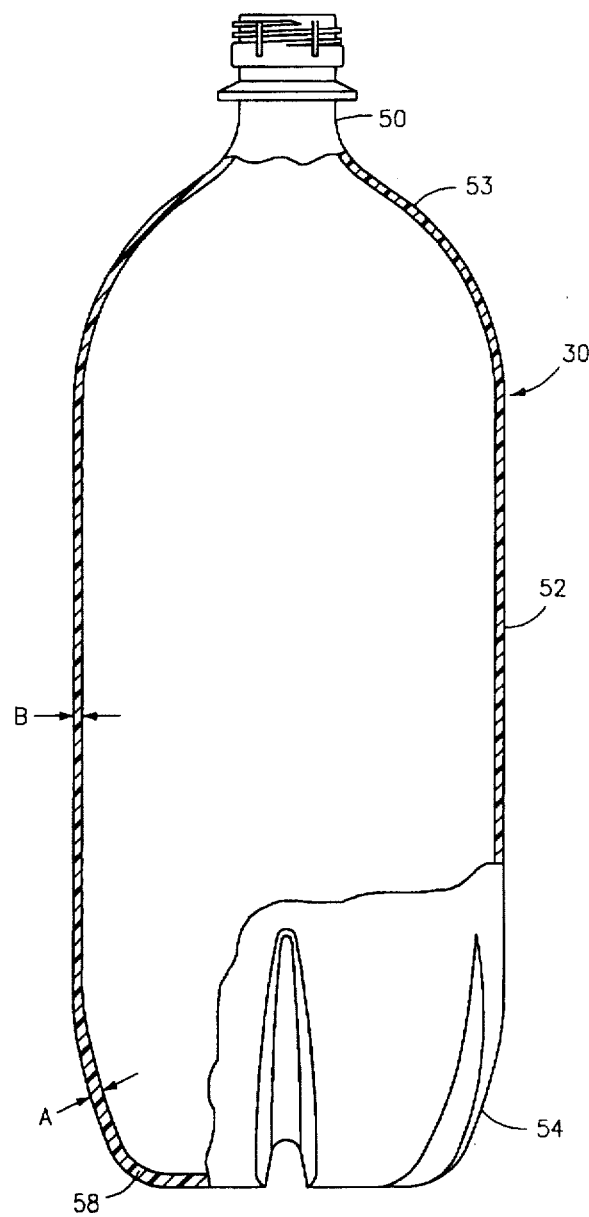
FIG. 6 is a elevational and partially cross-sectional view of the footed container shown in FIG. 5.

Blow mold 34, shown in FIG. 3, has a cavity which is designed in the shape of container 30 shown in FIGS. 5 and 6. Blow mold 34 includes an elongated side wall 35 and a bottom portion 36 having a plurality of foot forming cavities 38.

As is common practice, the preform is heated to the temperature appropriate for blow molding as by means of radiant heaters and is rotated by conventional means (not shown) in front of said heaters to obtain uniform distribution of heat. Upon completion of heating, radiation is stopped and the preform is placed into the blow mold. In the present case, said placement must accord with the position of the foot forming cavities so that the thickened portions of the preform are appropriately positioned in relation thereto, e.g., the thickened portions are preferably offset sideways from the feet. Since they are thick, they remain hot and therefore stretch first into the feet. The position of the location sensor such as notch 32 may be monitored by corresponding conventional means, and the rotation stopped in the desired position before placing the preform into the mold. The blow mold itself may include such alignment means. For example, referring to FIG. 4, blow mold 34 includes a positioning mechanism 40 positioned on upper surface 39 thereof. Positioning mechanism 40 is adapted to a sense locating, such means as notch 32, such that when notch 32 is sensed, preform 10 is in the desired alignment with blow mold 34.

Positioning mechanism 40 may be in the form of a sensor 41 co-acting with a rotating mechanism 42. While preform 10 is being rotated by rotating mechanism 42, sensor 41 senses the periphery of ring 31, by suitable means, e.g., a mechanical detent, or a light beam. When notch 32 is sensed on the periphery, sensor 41 signals the rotating mechanism 42 to stop rotating preform 10.

When notch 32 is sensed, flat faces 26 are placed into a predetermined position adjacent foot-forming cavities 38 of blow mold 34. Each of flat faces 26 is positioned so as to supply the necessary amount of plastic into one of foot-forming cavities 38 of blow mold 34 such that upon blowing and stretching of preform 10, each thickened portion 24 of preform 10 corresponding with a face 26 and extending outwardly toward outer wall 22 between scalloped-shaped segments 29 of intermediate body portion 14, supplied material for a foot made in one foot-forming cavity 38.

The notch and positioning mechanisms discussed above are but an example for aligning the preform with blow mold such that the thickened portion are properly positioned relative to the foot-forming cavities of mold. Other techniques or designs known in the art can be used to accomplish the same purpose.

The thickened portions 24 of preform 10, as indicated by flat faces 26, are stretched into foot-forming cavities 38 allowing for increased molding material for the formation of the feet of container 30. This process allows for decreased brittleness and overstretching and increased elasticity of the material stretch-blown into the foot-forming cavities. That is, because thickened portions 24 defined by flat faces 26 are relatively thick, they retain heat, avoid premature cooling and facilitate flow of material into the feet, thereby minimizing subsequent overstretching and brittleness.

The resulting container 30 as shown in FIGS. 5 and 6 includes a neck portion 50, an intermediate cylindrical side wall 52, a shoulder portion 53 between the neck and sidewall, and a bottom portion 54 having a central portion 56 and a plurality of feet 58 depending from side wall 52 and separated by indented areas 60. As shown in FIG. 6, the wall thickness A of feet 58 is at least equal to the wall thickness B of intermediate cylindrical side wall 52. This increased thickness results from thickened portions 24 defined by the material between flat faces 26 and outer wall 22 of preform 10, as shown in FIGS. 1 and 2, being stretch blow molded into foot-forming cavities 38 of mold 34, as discussed above for FIG. 3. The initially thicker portions 24 between scalloped-shaped segments 29 supply material for the relatively thickened walls for feet 58.

In forming container 30, and referring to FIGS. 1-4, preform 10 is placed into blow mold 34. Notch 32 or other desired alignment means, as on the support ring 31 of preform 10 may be aligned with the blow mold as provided above via positioning mechanism 40. Once notch 32 is sensed or engaged, preform 10 is aligned in the correct position for blowing. That is, thickened portions 24 defined between flat faces 26 and outer wall 22 and between scalloped-shaped segments 29 are individually positioned in relation to foot-forming cavities 38 of blow mold 34 such that upon stretching preforms 10 into blow mold 34, the thickened portions contribute most of the material that is displaced into the foot-forming cavities 38. The next step in the process is to stretch blow mold preform 10 into the container form of blow mold 34 thereby forming container 30 having feet 58 which are at least substantially equal in wall thickness to the wall thickness of the rest of the container.

In accordance with the above, the desired distribution of material is maintained during the blow molding of feet 58 of bottom portion 54 of container 30 via thickened portions 24 of preform 10, preventing the possibility of overstretching the material and causing it to become brittle. As a result, a container 30 is blown that has walls of sufficient thickness comprising feet 58. With the aforementioned process, a simpler preform geometry can be used for forming the footed containers in comparison with currently available techniques.

The primary advantage of this invention is that a footed container and process for making the same is provided which eliminates the shortfalls of footed containers according to the prior art. Another advantage of this invention is that a plastic footed container is provided having walls of sufficient thickness in the foot forming areas for achieving greater container stability and for improved materials properties such that overstretching of material in the area of the footed portions is prevented. Still another advantage of this invention is that a process is provided for forming a footed container having relatively thickened walls from a preform having thickened segments.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for forming a footed plastic container, comprising the steps of:

providing a preform having a neck portion with an open top end and an elongated cylindrical body portion including a lower end, said body portion having an inner and outer wall, wherein said lower end includes a plurality of thickened portions separated by portions of lesser thickness;

providing a blow mold having a cavity in the shape of a footed container having a plurality of individual foot forming cavities;

inserting said preform into said blow mold;

placing each of said thickened portions in a predetermined position relative to corresponding ones of said foot forming cavities; and stretching said elongated body portion and blow molding said preform to form a blow molded container having an elongated side wall and footed portions separated by indented areas between the footed portions, including displacing material from each of said thickened portions into corresponding ones of said foot forming cavities and displacing the portions of lesser thickness into respective ones of said indented areas between the footed portions so that said thickened portions form substantially the entire container footed portions including side walls of the footed portions wherein the thickened portion prevent overstretching of material in the footed portions so that the wall thickness of the footed portions is at least equal to the wall thickness of elongated side wall of the container.

2. The process according to claim 1, further comprising the step of adjusting the placement of said preform to acquire a predetermined position of said thickened portions relative to said foot forming cavities.

3. The process according to claim 1, wherein said preform includes means for positioning said thickened portions, and further comprising the step of:

sensing and positioning said means for positioning said thickened portions and thereby placing said thickened portions relative to said foot forming cavities such that each of said thickened portions corresponds to one of said foot forming cavities.

4. The process according to claim 2, wherein said preform includes means for positioning said thickened portions and said blow mold includes sensing means for sensing and positioning said means for positioning;

engaging said sensing means with said means for positioning such that each of said thickened portions corresponds with said one of said foot forming cavities.

5. The process according to claim 3, further including the step of rotating the preform and stopping said rotation by interaction of a sensing means and said means for positioning.

6. The process according to claim 5, including the step of providing said means for positioning on the preform neck portion and sensing the means for positioning by the sensing means.

7. The process according to claim 6, including the step of placing said means for positioning on a support ring located on the neck portion.

8. The process according to claim 1, including the step of providing each of said thickened portions with terminal ends and interconnecting said terminal ends with sections of reduced thickness.

9. The process according to claim 8, including the step of forming said sections of reduced thickness as scalloped shaped sections.

* * * * *